Patented Jan. 2, 1923.

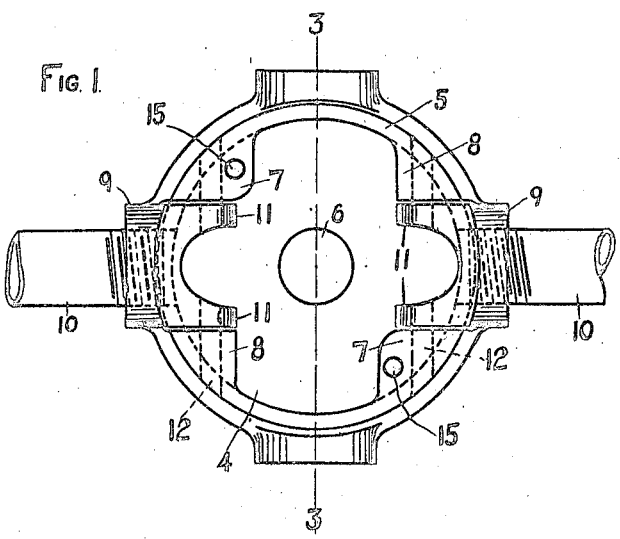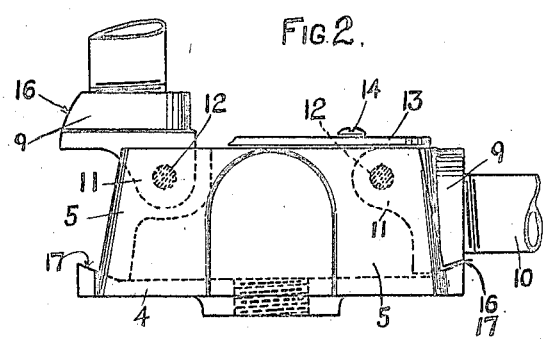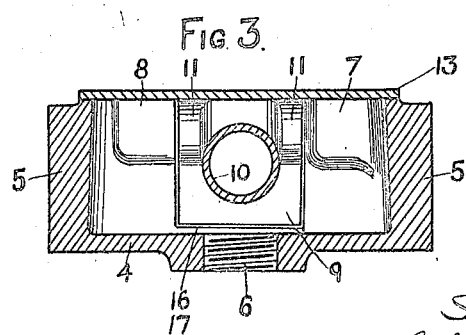

1,440,389

UNITED STATES PATENT OFFICE.

JOHN WILLIAM JONES, OF PERTH, SCOTLAND.

JUNCTION BOX FOR CONDUIT PIPING.

Application filed March 3, 1922. Serial No. 540,853.

*To all whom it may concern:*

Be it known that I, JOHN WILLIAM JONES, British subject, and a resident of Perth, Scotland, have invented certain new and useful Improvements in Junction Boxes for Conduit Piping, of which the following is a specification.

This invention relates to junction boxes for conduit piping and has for its object to facilitate the fitting of the conduit piping to the junction box, more especially in positions difficult of access, such as for instance when the junction box is attached to the ceiling or some position overhead.

According to the present invention, the socket or sockets of the junction box are pivoted or hinged in such a manner that the sockets may be turned out of the plane of the junction box into a position at any desired angle thereto, so that the conduit piping may be conveniently fitted into the sockets and the latter thereupon swung into the plane of the junction box. The pivoted or hinged sockets may be secured in normal position in any convenient manner, preferably by means of the usual cover plate or disc of the junction box.

The hinged sockets are preferably formed with a bevelled face adapted to fit a correspondingly bevelled face on the base of the junction box so that when the junction box is attached to the ceiling any moisture will drop past the outer edges of these beveled faces thus providing a substantial watertight joint.

In order that the invention may be more clearly understood reference is hereinafter made to the accompanying drawings showing a two-way junction box by way of example, but it will be understood that my invention may be applied to junction boxes having any desired number of conduit pipe connections. The invention is also illustrated by way of example as applied to a junction box of a type at present commonly in use, but it will be understood that my invention is not limited to junction boxes of the construction shown.

Fig. 1 is a plan view of the junction box with the cover plate removed.

Fig. 2 is a side view showing one of the sockets and conduit pipes turned into a position at right angles to the plane of the junction box.

Fig. 3 is a sectional elevation on the line 3—3 of Fig. 1.

In the construction illustrated the junction box comprises a base 4 having an upstanding rim or flange 5 and a central junction aperture 6. The flange 5 is formed internally with enlargements or projections 7 and 8 and is slotted to receive the socket 9 for the conduit piping 10. The socket 9 is formed with a pair of lugs 11 and is hinged to the junction box by means of hinge pins 12 passing through the projections 7, 8 and lugs 11, the arrangement being such that the socket 9 may be turned into any desired position from the plane of the junction box to an angle thereto. The socket 9 may be secured in its position in the plane of the junction box by means of the usual cover plate or fibre disc 13 secured to the junction box by screws 14 passing through tapped holes 15 in the projections 7.

In the case of overhead work, the workman may turn the sockets 9 into a vertical position, thus enabling him to screw the conduit piping into the socket vertically and thereupon swing the socket and conduit piping into the plane of the junction box.

It will be understood that the socket 9 may be hinged to the junction box in any suitable manner other than that shown on the drawings.

In order to obtain a substantial water tight fitting, the socket 9 is preferably formed with a bevelled face 16 adapted to closely fit a correspondingly bevelled face 17 on the base 4 of the junction box. When the cover plate or disc 13 is fixed in position, the sockets 9 are firmly held in position and cannot be displaced until the cover plate 13 is removed.

It will be clear that any size of conduit piping 10 may be used by corresponding tapping of the internal screw threads in the sockets 9.

Claims:

1. A junction box for conduit piping comprising sockets movably connected thereto and normally lying in the plane of said junction box, said sockets being adapted to be turned from said plane into a position at any desired angle thereto up to a right angle so that their corresponding piping can be readily connected to them.

2. A junction box for conduit piping provided with slots in its side walls, sockets hinged to said side walls and positioned within said slots, said sockets normally lying in the plane of said junction box but are adapted to be turned from said plane into a position at any desired angle thereto up to a right angle so that their corresponding piping can be readily connected to them.

3. A junction box for conduit piping comprising sockets movably connected thereto and normally lying in the plane of said junction box, said sockets being adapted to be turned from said plane into a position at any desired angle thereto so that their corresponding piping can be readily connected to them, and a detachable cover for said junction box, said cover when in its attached position holding the sockets in their normal position.

4. A junction box for conduit piping comprising sockets movably connected thereto and normally lying in the plane of said junction box, said pockets being adapted to be turned from said plane into a position at any desired angle thereto up to a right angle so that their corresponding piping can be readily connected to them, said sockets being formed with bevelled faces which co-act with correspondingly bevelled faces formed on the base of said junction box, when the sockets are in their normal position.

5. A junction box for conduit piping comprising sockets pivotally connected thereto and normally lying in the plane of said junction box, said sockets being adapted to be turned from said plane into a position at any desired angle thereto up to a right angle so that their corresponding piping can be readily connected to them.

In testimony whereof I affix my signature.

JOHN WILLIAM JONES.

Certificate of Correction.

It is hereby certified that in Letters Patent No. 1,440,389, granted January 2, 1923, upon the application of John William Jones, of Perth, Scotland, for an improvement in "Junction Boxes for Conduit Piping," an error appears in the printed specification requiring correction as follows: Page 2, line 19, claim 4, for the word " pockets " read *sockets;* and that the said Letters Patent should be read with this correction therein that the same may conform to the record of the case in the Patent Office.

Signed and sealed this 23d day of January, A. D., 1923.

[SEAL.] KARL FENNING,
*Acting Commissioner of Patents.*